United States Patent Office 3,545,940
Patented Dec. 8, 1970

3,545,940
COPPER CHLORIDE CRYSTAL GROWTH
IN SILICA GEL MATRIX
John J. O'Connor, Arlington, Bernard Rubin, Belmont, and Alton F. Armington, Lexington, Mass., assignors to the United States of America as represented by the Secretary of the Air Force
No Drawing. Filed Sept. 21, 1967, Ser. No. 669,669
Int. Cl. B01d 9/02; C01b 9/02; C01g 3/04
U.S. Cl. 23—300
2 Claims

ABSTRACT OF THE DISCLOSURE

A method for forming single crystals within a gel matrix using a complexed crystal producing material as the source for crystal growth. Growth of a desired crystal is accomplished by placing a saturated solution of an appropriate crystal growing material and a compatible acid complexing agent in contact with a porous gel. The solution is then allowed to diffuse through the gel. The complexing agent diffuses through the gel at a more rapid rate than the crystal growing material thus enabling the crystal growing material to precipitate out as single crystals.

This invention relates to a method for growing crystalline materials in a gel. More particularly, this invention concerns itself with a method for forming single crystals within a gel matrix by using complexing agents to effect precipitation of the crystal material from solution.

The use of single crystals as modulators for laser devices has created a need for the development of crystalline materials that possess a high degree of overall quality and the requisite electromagnetic characteristics. Crystalline materials such as cuprous chloride, cuprous bromide, silver chloride, lead sulfide and mercury sulfide possess the necessary electromagnetic characteristics and are generally grown from a melt by utilizing extremely high temperatures. The melt method, however, possesses certain disadvantages since the presence of a phase transition below the melting point often produces strain and stress faults within the crystal structure. The stresses and strains are further intensified by various temperature gradients encountered within the crystal structure during cooling from the melting point to room temperature. Contamination from container materials is also another serious disadvantage often encountered when using the melt method for crystalline growth.

In an attempt to overcome the disadvantages of this method, it has been found that crystalline materials can be grown within a gel matrix. This method generally involves a chemical reaction in the gel between two soluble reactants to form an unsoluble product. The growth of calcium tartrate crystals from calcium chloride and sodium tartrate typifies the results achieved by utilizing this method. Crystal growth within a gel may also involve growth by diffusion of ions through a gel sandwiched between solutions containing the ions to be combined or into a gel which contains one of the reactants. However, the utilization of the well-known gel method for growing crystals which possess desirable electromagnetic characteristics, such as cuprous chloride, has not proved feasible. Attempts to grow single crystals of sufficient form, clarity, size and overall quality required for use in laser devices has proved unsuccessful.

With the present invention, however, it has been found that single crystals can be formed that are of sufficient size, mechanically sound, relatively free of bits and foreign inclusions, possess well-developed crystalline faces and the high degree of overall quality that permits their use in critical microwave and coherent radiation applications.

Accordingly, the primary object of this invention is to provide a novel and simplified method for forming high quality single crystals.

Another object of this invention is to provide a method for forming single crystals within a gel matrix.

Still another object of this invention is to provide a method for forming single crystals from a crystal-growing solution by utilizing a complexing agent to affect precipitation of the crystalline material within a gel matrix.

Still further objects, advantages and features of this invention will become apparent upon consideration of the following detailed description thereof.

In accordance with this invention, it has been found that the foregoing objects can be accomplished by placing a crystalline containing solution in contact with a porous gel. The crystalline material is rendered soluble in the solution by an acid complexing agent and allowed to diffuse through the gel matrix. The complexing agent diffuses at a faster rate than the desired crystalline material thus causing the desired crystalline material to precipitate out as single crystals.

The complexed material tends to precipitate out of the solution during dilution. Thus, the role of the gel, in the method disclosed herein, is to control the dilution of the solution diffusing through it. For example, a saturated solution of cuprous chloride in hydrochloride acid may be placed above and in contact with a silica gel. After a sufficient period of time, precipitation of cuprous chloride occurs within the gel matrix since the hydrochloric acid diffuses through the gel more rapidly than the copper compound. This causes the solution to become supersaturated behind the acid front thus affecting precipitation of cuprous chloride as single crystals.

The cuprous chloride forms a soluble complex in a fairly strong hydrochloric acid solution but the complex is unstable in dilute acid which leads to the precipitation of the cuprous chloride. The gel matrix is used to control the loss of the chloride ion and the slow precipitation of cuprous chloride results in the formation of the single crystals.

By using a complexing agent as suggested by the present invention, it has been found possible to grow high quality single crystals at room temperatures which could formerly be grown only at high temperatures. The crystals are grown in contact with only a porous gel and a nutrient solution and thus the method of this invention eliminates the thermal strain which is produced in crystal structures grown at the high temperatures employed in the melt method. In utilizing previously known gel methods for growing crystalline materials, such as cuprous chloride, crystalline growth proved unsatisfactory since the crystalline tended to grow upward from the gel interface rather than inside the gel thus producing crystals which were skeletal in form and lacked the requisite quality needed for use in laser applications.

With the foregoing general discussion in mind, there is presented herewith a detailed specific example which will illustrate to those skilled in the art the manner in which this invention is carried out in effect. The example discloses a process for growing well-formed, single crystals of cuprous chloride within a silica gel matrix.

EXAMPLE

A silica gel is first prepared by titrating 1 N hydrochloric acid with 0.5 N sodium metasilicate to a desired pH and allowing 25 ml. of this solution to gel in a 50 ml. test tube (2 cm. diameter). All solutions had previously been passed through a 0.45 micron millipore filter in order to eliminate any particles which might serve as nucleation sites. The gel was allowed to set overnight in the test tube at 40° C. After the gel had formed, about 10 to 15 ml of a hydrochloric caid solution saturated with cuprous chloride was added to the test tube and allowed to come in contact with the gel. The solution was covered with a layer of paraffin oil to reduce oxidation. The test tube was stoppered and the diffusion reaction was allowed to proceed in the dark at room temperature. The pH of the gel had no observable effect on the product. However, a gel of about pH 5 was employed in this example. As the hydrochloric acid solution diffused through the gel, the complexed cuprous chloride precipitated out of the solution because the hydrochloric acid complexing agent was diluted by the process. Tetrahedron crystals of cuprous chloride were produced in about two weeks with growth being completed in from three to four weeks.

The normality of the hydrochloric acid complexing agent may vary from about 0.75 to 6. However, no appreciable crystalline growth is formed when the normality is below about 3. A very fine crystalline material results from the utilization of a 3 N hydrochloric acid solution. Optimum results, however, are achieved by utilizing a 6 N hydrochloric acid solution. The pH of the gel was varied from 3 to 5 in a number of experiments and did not have any measurable effect on the end product. Likewise, there was no observable difference in crystal formation whether the gels were formed in the light or dark.

The crystals were separated from the gel and generally formed perfect tetrahedra. They were then cleaned by etching one minute in an etching solution containing 1 part of 48% hydrochloric acid to 10 parts of water. This was followed by rinsing in a 0.5 N hydrochloric acid solution and a rinse in acetone. The crystals were then dried and stored in vacuum.

Electron microprobe measurements of the resultant crystals indicated a uniform stoichiometric concentration of copper and chlorine in all crystals tested. Measurements for silicon, which would be present if the crystal contained inclusions, were negative except on the surface of the crystals indicating that some silica gel remained on the surface after cleaning. Transmission patterns showed three-fold symmetry which is consistent with the (111) faces of the cubic material. The crystals stored well in vacuum both in the light and in the dark. The crystals were uniform in composition, of good purity, and show no evidence of inclusions.

To a close approximation, the concentration of cuprous chloride in solution is directly proportional to the concentration of hydrochloric acid used to complex the compound. Saturated solutions of cuprous chloride in hydrochloric acid were employed in a set of additional experiments, with the hydrochloric acid concentration being varied from 3 to 8 N at 0.5 N increments. Attempts were made to grow crystals at room temperatures (22° C.) in the dark with a reaction time of approximately three weeks. The results indicated that no cuprous chloride crystals were formed from solutions initially containing less than about 4 N hydrochloric acid. However, well-formed, clear crystals were produced in the 4 N to 6 N range with the best crystals being formed at about 5 normality.

At concentrations above 6 N, the gel tended to break resulting in visible channels containing the nutrient solution. Such a condition caused the dilution to be too rapid, resulting in the formation of a large number of microscopically small crystals. An additional series of experiments were performed using the same parameters with the only variable being the absence of normal room lighting which included both fluorescent and sunlight. Presence of light did not appear to affect the perfection of the crystals during growth.

Additional attempts to grow crystals, keeping all parameters the same, except for temperature, were made using growing temperatures of 4°, 22°, 30° and 50° C. At the 4° C. level, the nucleation and growth process was very slow and few crystals were formed. After several months the crystals appeared still to be growing and increasing in size. The growth of crystals at 22° and 30° C. appeared to be the same with formation of crystals taking from about two to three weeks. No crystals of good quality were formed at 50° C.

The silica gel matrix was formed at 22°, 30°, 40° and 50° C., both in the light and in the dark, in an additional series of tests. Crystal growth was then performed in the dark at 22° C. The gels formed at 22°, 30° and 40° C.; all produced similar results. The crystals were all tetrahedron in shape with clear crystals being formed at each temperature. At the 50° C. level, however, there was a tendency for the cuprous chloride to form as long needles extending down from the gel interface. No tetrahedron crystals were formed. There was no observable difference in crystal formation whether the gels were initially formed in the light or in the dark.

From a consideration of the foregoing, it can be seen that this invention provides a simplified and efficient method for growing high quality single crystals which possess electromagnetic characteristics. Stoichiometrically proportioned single crystals of cuprous chloride were successfully grown by using the method of this invention. These crystals have proven to be especially valuable for use in laser applications.

It will be understood by those skilled in the art, to which the present invention pertains, that while the invention disclosed herein illustrates a preferred embodiment of the invention, various modifications and alterations can be made without departing from the spirit and scope thereof and that all such modifications as fall within the scope of the appended claims are intended to be included herein.

What is claimed is:

1. A method for growing single crystals in contact with only a porous gel and a nutrient solution comprising the steps of forming a porous silica gel matrix within a suitable container, preparing a saturated nutrient solution of cuprous chloride and a hydrochloric acid complexing agent compatible therewith, introducing said nutrient solution into said container and in contact with the gel, allowing the nutrient solution to remain contact with the said gel for a period of time sufficient to affect precipitation of the crystal-growing material out of solution thereby forming tetrahedron shaped single crystals within the gel matrix.

2. A method in accordance with claim 1, wherein said nutrient solution is allowed to remain in contact with said gel for a period of time of about two to four weeks.

References Cited

UNITED STATES PATENTS

| | | | |
|---|---|---|---|
| 1,964,569 | 6/1934 | Gernes | 23—299 |
| 2,323,631 | 7/1943 | Stadler | 23—97 |
| 2,478,519 | 8/1949 | Ashley | 252—317X |
| 2,595,056 | 4/1952 | Connolly | 252—317 |

OTHER REFERENCES

Fehlner, F. P.; Growing Crystals Journal of Chemical Education, vol. 33, No. 9 September 1956.

NORMAN YUDKOFF, Primary Examiner

A. F. PURCELL, Assistant Examiner

U.S. Cl. X.R.

23—97, 295, 305